M. BRACEY.
TIRE CORE.
APPLICATION FILED NOV. 4, 1913.
1,140,242.
Patented May 18, 1915.
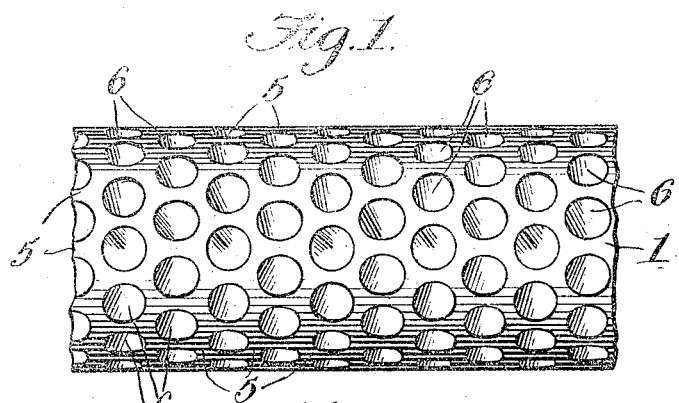
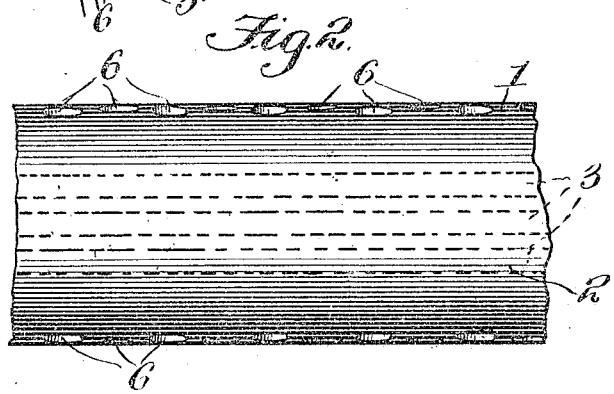
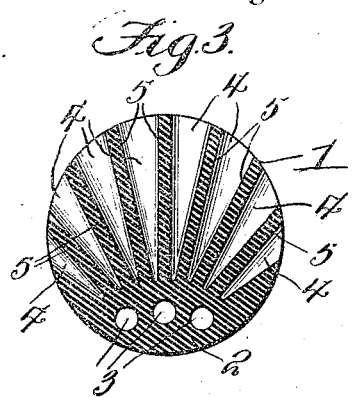
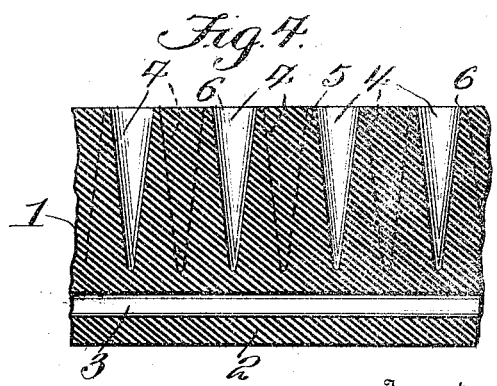
Witnesses
J. L. Wright
C. C. Hines
Inventor
M. Bracey
By Victor J. Evans
Attorney

UNITED STATES PATENT OFFICE.

MONSEL BRACEY, OF THOMASVILLE, GEORGIA.

TIRE-CORE.

1,140,242. Specification of Letters Patent. Patented May 18, 1915.

Application filed November 4, 1913. Serial No. 799,208.

*To all whom it may concern:*

Be it known that I, MONSEL BRACEY, a citizen of the United States, residing at Thomasville, in the county of Thomas and State of Georgia, have invented new and useful Improvements in Tire-Cores, of which the following is a specification.

This invention relates to cores or fillers for the air tubes on pneumatic tires, the object of the invention being to provide a core of rubber of other suitable material adapted to be inserted within the air containing tube or casing of a tire and to be employed as a cushioning medium in place of air, whereby the disabling of tires from punctures, blow-outs and other similar injuries will be avoided.

A further object of the invention is to provide a core or filler of the character set forth which will afford ample resiliency in all directions, which is comparatively light in weight so that it will not render the tire cumbersome or unduly heavy, and which is constructed in a novel manner to secure strength, durability and ample resiliency.

The invention consists of the features of construction, combination and arrangement of parts herein fully described and claimed, reference being had to the accompanying drawing in which:—

Figure 1 is a top plan view of a fragment of a core or filler embodying my invention. Fig. 2 is a bottom plan view of the same. Fig. 3 is a vertical transverse section through the filler. Fig. 4 is a longitudinal section thereof.

The filler 1, which is made of a rubber composition, or any similar material possessing a necessary degree of resiliency, is circular in cross section and of a proper diameter and length to snugly fit within and extend around the interior of an inner tube or casing of any determined dimensions. The tube will thus inclose the filler and form a casing therefor, whereby the filler is retained in position within the outer tube or shoe.

The inner portion or rim side of the filler is substantially solid, as shown at 2, but may be provided with a series of longitudinal openings 3 to secure greater likeness and flexibility if desired. From this portion 2 to the remainder of the periphery of the filler, the filler is of a cellular structure, being provided with a series of tapered or conical cells or pockets 4, which extend inwardly toward the side 2 from the tread surface and sides proper of the tire, producing intervening elastic webs 5. The said pockets or cells 4 communicate at their outer ends with openings 6 formed in the periphery of the filler, and said cells and openings are arranged in preferably staggered rows throughout the circumferential length of the filler, the pockets and opening of each row alternating in arrangement with the pockets and openings of the adjacent rows, both longitudinally and transverse of the filler, thereby enabling a maximum number of cells or pockets and openings to be formed without unduly weakening the body of the filler and connecting webs.

It will be observed from the foregoing description, and by particular reference to Fig. 3 of the drawing, that the cells and webs taper inwardly and extend outwardly on relatively diverging lines in a fan-shaped arrangement, whereby the tread portion of the filler is given maximum resiliency, which diminishes gradually and progressively as such tread portion is compressed toward the side 2, thus enabling a maximum cushioning action to be obtained, while at the same time avoiding undue resiliency and lateral distension of the filler and liability of rupture of the connecting webs. Such construction also permits of an ample degree of lateral resiliency of the filler for a cushioning action when side pressure falls upon the tire.

It will be understood that the cells or pockets, in addition to lightening the filler and imparting thereto a determined range of flexibility and resiliency, also serve as receptacles for a certain amount of air under natural and atmospheric pressure, which enters and leaves the pockets through the openings 6 and is adapted to be compressed within the pockets when the filler is under compression to give an added cushioning resiliency.

It will, of course, be understood that the filler when used in connection with an inner tube may be inserted in any suitable manner, and will take the place of the usual cushioning body of compressed air, but will afford a cushioning backing from the tire which overcomes and avoids all liability of serious damage to the tires from punctures, blowouts and other injuries, while at the same time giving to the tire all of the necessary life or resiliency to secure an efficient cushioning effect. The filler may be also employed in the place of an inner tube and without the latter as a core within an ordinary outer tube or shoe.

I claim:—

As a new and improved article of manufacture, a tire core filler comprising a body of resilient material of substantially circular form in cross section, said body being provided at its base portion with a transverse arcuate row of longitudinally extending curved passages, the remainder of the body being formed with transverse rows of radial cells opening through and toward the tread surface and sides thereof, the cells of each row radiating from an arcuate line concentric with said row of passages in fan-like arrangement, said cells being of conical form and flaring in an outward direction, the cells of each transverse row being arranged on lines between the cells of adjacent rows.

In testimony whereof I affix my signature in presence of two witnesses.

MONSEL BRACEY.

Witnesses:
 W. A. SUTTON,
 J. W. HEATH.